United States Patent [19]

Nandyal et al.

[11] 4,109,767

[45] Aug. 29, 1978

[54] COMPRESSION HEAD ASSEMBLY

[75] Inventors: Srinath Nandyal, Bloomingdale, Ill.; Sellers B. McNally, Scottsdale, Ariz.

[73] Assignee: Maremont Corporation, Chicago, Ill.

[21] Appl. No.: 774,499

[22] Filed: Mar. 4, 1977

[51] Int. Cl.$^2$ ............................................. F16F 9/06
[52] U.S. Cl. .................................. 188/315; 137/493.3; 137/493.6; 188/322
[58] Field of Search ................ 267/64 R, 64 A, 65 R; 188/314, 315, 322; 137/493.3, , 493.6

[56] References Cited

U.S. PATENT DOCUMENTS

| 2,338,162 | 1/1944 | Boor | 188/322 |
|---|---|---|---|
| 2,507,267 | 5/1950 | Patriquin | 188/322 |
| 2,531,532 | 11/1950 | Rossman | 188/322 |
| 2,596,982 | 5/1952 | Chrisholm, Jr. | 137/493.6 |
| 2,788,092 | 4/1957 | Whisler, Jr. | 188/322 |

FOREIGN PATENT DOCUMENTS

| 1,126,815 | 12/1956 | France | 188/322 |
|---|---|---|---|
| 1,072,923 | 9/1954 | France | 188/322 |
| 1,095,054 | 12/1960 | Fed. Rep. of Germany | 188/322 |

Primary Examiner—Trygve M. Blix
Assistant Examiner—Edward R. Kazenske
Attorney, Agent, or Firm—Cushman, Darby & Cushman

[57] ABSTRACT

A compression and replenishing valve structure for a direct double acting shock absorber constructed primarily from stamped parts so that the replenishing valve and the compression valve are mounted concentrically, the compression valve being mounted within the hollow valve stem of the replenishing valve and positioned over its respective seat thereby.

1 Claim, 12 Drawing Figures

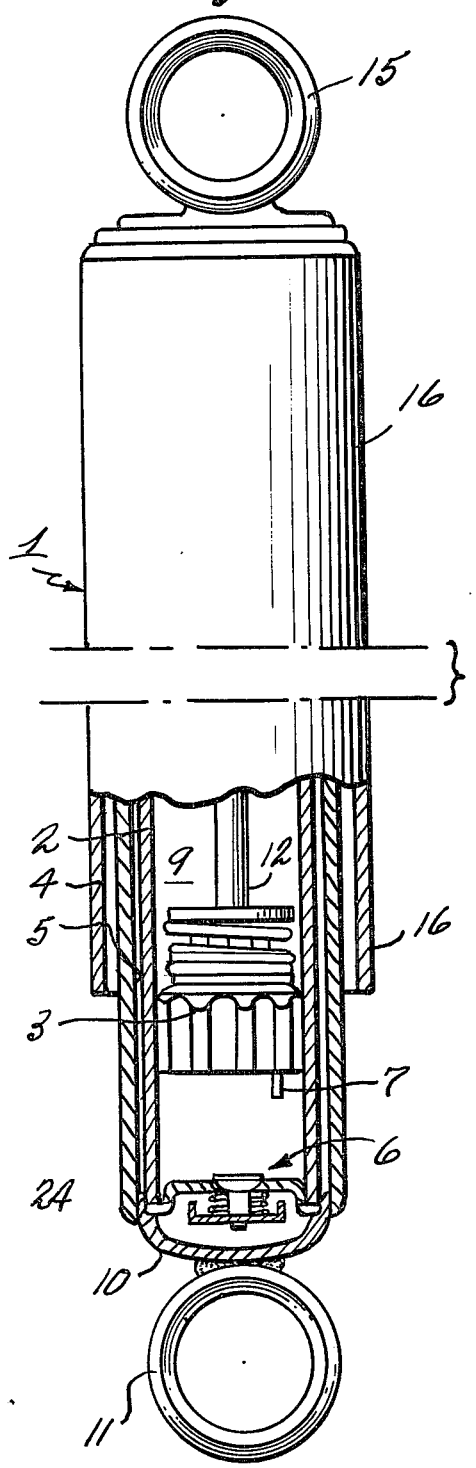
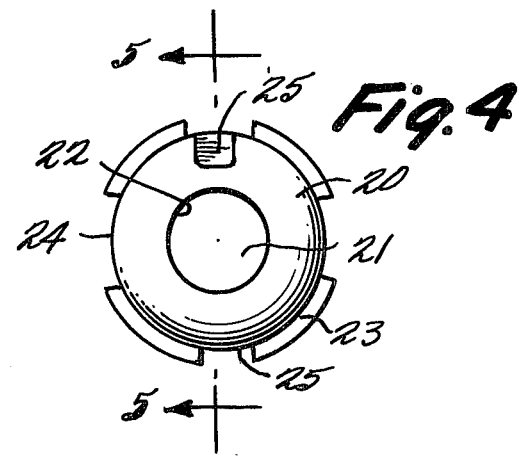
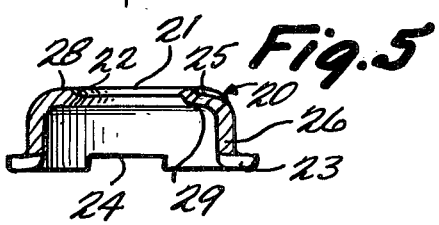
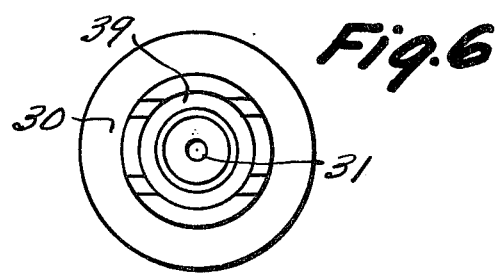
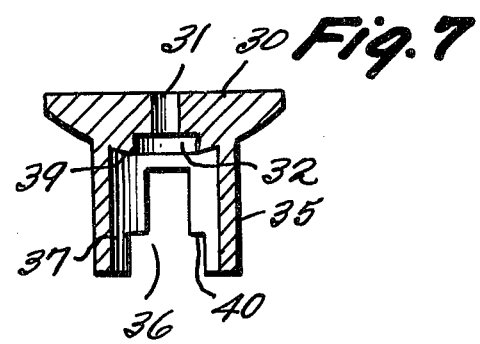

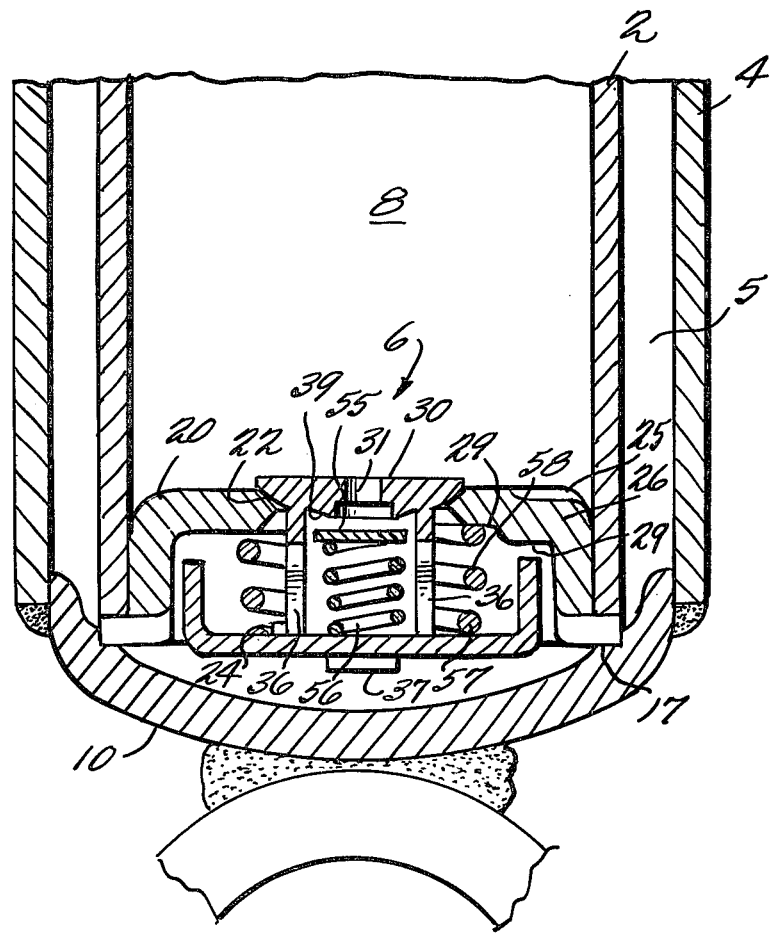
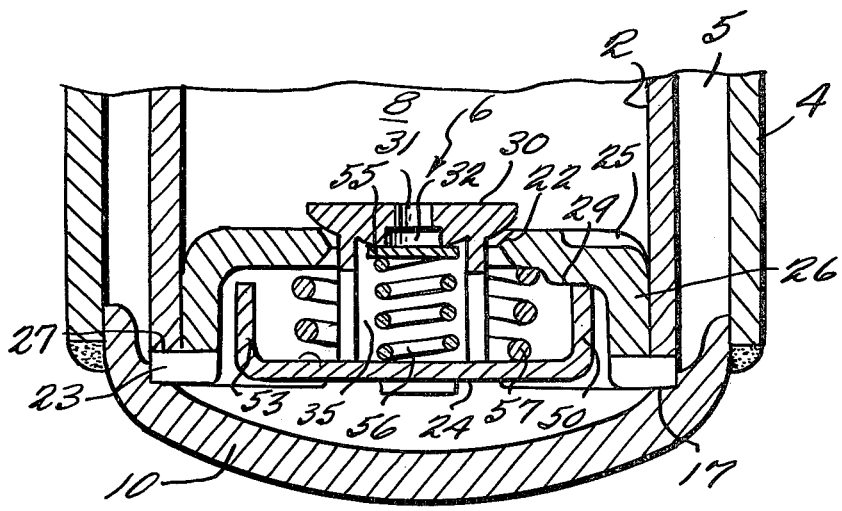

COMPRESSION HEAD ASSEMBLY

The present invention relates to hydraulic shock absorbers of the direct double-acting tubular type, and more particularly to a compression and replenishing valve structure for this type of shock absorber.

Direct double-acting tubular shock absorbers utilized on automotive vehicles having spring-suspended frames usually comprise a cylinder attached to the axle of the vehicle and a piston in the cylinder which is connected with the frame so that when the wheels of the vehicle pass over an uneven surface the piston and cylinder move relative to one another. The cylinder contains a suitable damping fluid which is expelled from one end of the cylinder into a reservoir when the axle and frame move toward one another, relatively. This action is referred to as the compression stroke of the shock absorber and in many instances the valving within the shock absorber is designed to restrict the flow of fluid from the cylinder during the compression stroke and thus restrain the motion of the vehicle. When the cylinder and piston move in the opposite direction, after compression, i.e., on recoil, it is desirable to cause the oil to freely re-enter the cylinder so that the tendency of the piston to create a vacuum in the cylinder is obviated by the relatively free entrance of oil into the cylinder.

The present invention is directed to a valve structure to be employed in the cylinder to control the passage of oil from and to the cylinder on the compression and recoil movements of the shock absorber respectively. This relatively inexpensive valve structure is constructed so that it restricts the flow of fluid from the cylinder on compression and affords relatively free passage of fluid to replenish the cylinder on recoil.

An object of this invention is to provide a valve structure of the character referred to in the preceding paragraph in which the compression valve can be stamped from sheet material and which is positioned over its respective seat without use of a valve stem mounted on the valve thus enabling the valve to be of lighter weight and more responsive in operation.

Still another object is to provide a compression valve structure which does not require a central opening to position the valve over its seat and thus removes the possibility of leakage through the central opening.

Still another object of this invention is to provide a valve structure consisting of a minimum of parts which may be inexpensively manufactured.

Other objects and advantages of the invention will be apparent from the following description of the preferred embodiments of the invention, reference being made to the accompanying drawings wherein;

FIG. 1 is an elevational view, partly in section, of a direct double-action shock absorber suitable for use on an automobile;

FIG. 2 is a fragmentary elevational view in section and on a larger scale showing the one embodiment of the compression and replenishing valve structure for the shock absorber shown in FIG. 1, the parts of this valve structure being shown in the position assumed during compression stroke;

FIG. 3 is a fragmentary elevational view like FIG. 2 but showing parts of the valve structure in a position assumed during recoil stroke of the shock absorber;

FIG. 4 is a detailed view of the compression head shown in FIGS. 2 and 3;

FIG. 5 is a sectional view of FIG. 4 taken along line 5—5;

FIG. 6 is a detailed elevational view of the replenishing valve shown in FIGS. 2 and 3;

FIG. 7 is a vertical sectional view of the replenishing valve shown in FIG. 6;

Figure 8:
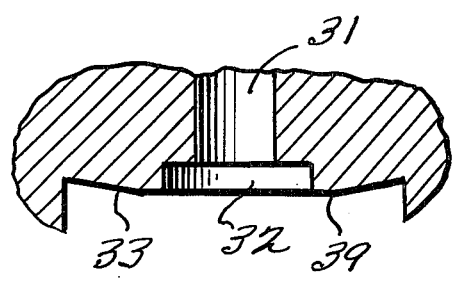
FIG. 8 is an expanded view of a portion of FIG. 7 showing the valve seat.

Referring to the drawings, wherein like reference characters designate like or corresponding parts throughout the several views, a shock absorber 1, shown in FIG. 1, may be similar in general construction to the well-known types of direct double-acting shock absorbers shown in the prior art except for the compression and replenishing valve structure. The shock absorber 1 comprises a cylinder 2 in which a piston 3 is adapted to reciprocate. This piston divides the cylinder 2 into a lower chamber portion 8 and an upper chamber portion 9. The piston may be of the type generally shown in the prior art or may be one of the adjustable types like those shown in the patent to Whistler U.S. Pat. No. 2,788,092 of Apr. 9, 1957 or Patriquin, U.S. Pat. No. 2,507,267 of May 9, 1950. The cylinder 2, is mounted concentrically within the cylinder 4 and spaced therefrom to form an oil reservoir or replenishing chamber 5 intermediate the cylinders. The two cylinders are suitably connected at their lower end to a common end cap 10 as shown in FIG. 2 which is provided with the usual ring 11 or other device by which one end of the shock absorber may be attached to the axle of the vehicle. The upper ends of the cylinders 2 and 4 have the usual construction for reception of the piston rod 12 which is connected at one end to the piston 3 and the opposite end to a ring 15 or other suitable structure. This ring 15 may be suitably attached to the frame of the vehicle as is well understood in the art. An outer cylindrical casing 16 is attached to the ring structure 15 and surrounds the cylinders 2 and 4 and provides a shield for the piston rod 12 while the cylinders are adapted to telescope within the casing during relative movement between the cylinders and the piston.

Referring to FIGS. 2 and 3, a compression and replenishing valve assembly generally indicated at 6, is mounted in the lower end of the cylinder 2 and is seated in circular groove 17 in end cap 10. This assembly is adapted to control the flow of oil between the cylinder 2 and the reservoir 5 so that as the oil in the lower chamber portion 8 is acted upon during compression movement of the shock absorber the valve restricts the flow of oil to the reservoir but upon reverse movement or recoil the oil flows back into the cylinder and is relatively unrestricted.

This compression and replenishing valve assembly 6 is assembled from a number of separate parts one of which is a stamped cup-shaped metallic compression head 20. This compression head 20 has cylindrical side walls 26 whose outside diameter is of a size that when the member is inserted into the end of the lower chamber portion 8 the cylindrical outer surface seals with the interior wall of cylinder 2. This sealing prevents the leakage of damping fluid between the cylindrical wall 26 and the interior of the cylinder 2 while the shock absorber is in use.

The interior end of the cylindrical wall 26 is provided with an internally extending circular wall 28. This circular wall 28 is provided with a central bore 21 which defines a flow passage for damping fluid flowing between the replenishing chamber 5 and lower chamber portion 8 during rebound strokes of the shock absorber. The inner facing side of the wall 28 has a replenishing valve seat 22 located on the circumference of bore 21.

The lower and outer ends of the cylindrical wall 26 have angularly spaced radially extending flanges 23, which project out from the wall portions to contact the end of cylinder 2 on surface 27 and limit the axial movement of the compression head into the lower chamber portion. The spaces between the radial flanges 23 form ports 24 when the compression head 20 is installed in the lower chamber portion. In FIG. 1 it can be seen that these ports 24 provide communication between the lower chamber portion and the replenishing chamber.

A detent 25 can be provided in the upper face of the circular wall 28 for engaging the projection 7 on the piston 3. This allows the valving of the piston, if it is of the adjustable type, to be adjusted without disassembling the shock absorber. The downward internal projections 29 of the detent 25 presents a contact surface whose function will be subsequently fully explained.

Figure 11:
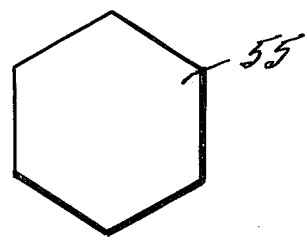
FIGS. 11 and 12 are detailed views of the compression valve shown in FIGS. 2 and 3.
Figure 12:
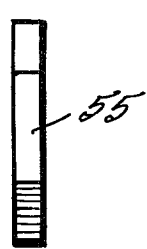

The compression and replenishing valve assembly 6 also has a circular replenishing valve 30 with a hollow stem portion 35 which is assembled in the compression head 20 with the stem 35 extending down through the central bore 21. This replenishing valve is shown in more detail in FIGS. 6, 7 and 8 as having a central circular port 31 providing fluid communication between the upper surface of the valve and interior of the hollow valve stem. This port provides a passageway for damping fluid during the compression stroke of the shock absorber. The port 31 is counter bored at 32 on the inside of the valve stem and is of a diameter less than the internal diameter of the hollow valve stem portion 35. A ring shaped valve seat 39 is formed between the circumference of the counter bore 32 and a conical surface 33. This valve seat 39 provides a seating surface for a compression valve member. This compression valve member 55 is shown in detail in FIGS. 11 and 12 as being of a flat hexagonal shape of a size which will fit into the hollow stem portion 35.

The valve stem portion 35 of the replenishing valve has two T-shaped slots 36 extending radially along opposite sides of the valve stem. These slots 36 form four shoulders 40 which provide locating surfaces for a valve spring retainer 50.

Figure 9:
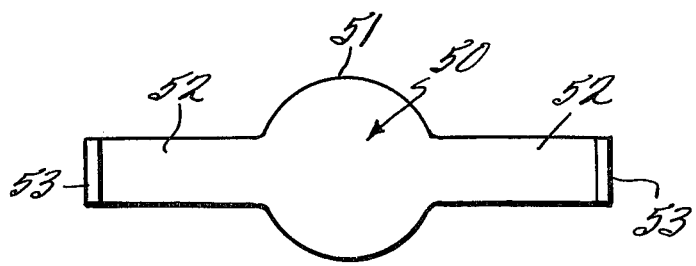
FIGS. 9 and 10 are detailed views of the valve spring retainer shown in FIGS. 2 and 3.
Figure 10:
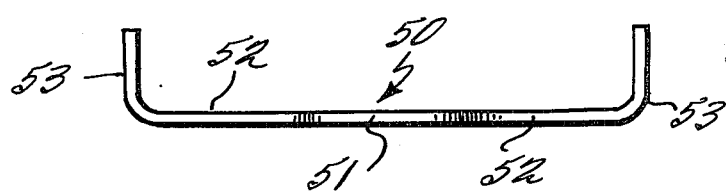

This valve spring retainer 50 is shown in detail in FIGS. 9 and 10 as being constructed of material of uniform thickness with a central circular portion 51 and two radially extending arms 52 whose end portions 53 are bent up perpendicularly to the circular portion 50. This circular portion 50 is of a diameter small enough to be inserted into the hollow portion of the stem 35.

To assemble the compression and replenishing valve assembly 6, the replenishing valve is first inserted through the central bore 21 in the compresssion head with the stem extending down through the bore 21 as shown in FIG. 2. The compression valve 55 is then inserted in the hollow portion of the valve stem 35, so that compression valve 55 rests on the valve seat 39. A cylindrical compression valve spring 56 is the positioned in the hollow portion of the valve stem 35 with one end contacting the lower surface of the compression valve 55. A conical replenishing valve spring 57 is placed around the valve stem portion 35 with the larger end 58 contacting the internal projections 29 of the detents 25.

The circular portion 51 of the valve spring retainer 50 is then inserted in the hollow portion of the valve stem 35 with the arms 52 extending radially through the slots 36 and with the bent portion 53 extending toward the inside surface of the compression head 20. By forcing the spring retainer into the slot 36 until it rests on the shoulders 40, the compression valve spring 56 and the replenishing valve spring 57 are both compressed. This compression causes the compression valve spring to force the compression valve in a direction toward its seat and likewise force the replenishing valve against its seat. The extending portion 37 of the valve stem is then bent as shown in FIG. 2, to hold the spring retainer 50 against the shoulders 40.

The compression head is then inserted into the cylinder 2, as shown in FIG. 2, until the radially extending portions 17 limit the movement of the compression head 20 into the cylinder. With the compression head 20 in place in the cylinder 2, the shock absorber is then assembled in a manner well known in the art.

The operation of this compression and replenishing valve 6 during the compression stroke is illustrated in FIG. 2. As the piston 3 moves axially along the cylinder 2 in a direction toward the compression and replenishing valve assembly 6, the energy of the fluid in the lower chamber portion 8 is increased and acts through the central port 31 on the face of the compression valve 55. When the energy of the fluid acting on the compression valve 55 reaches a level which overcomes the force of compression spring 56, the valve moves down and away from the vavle seat allowing damping fluid to flow through the port 31, then between the valve 55 and its valve seat 39 and into the hollow stem portion 35.

The fluid entering the hollow stem portion 35 which is limited by the size of port 31 then flows down through the slot 36 between the edges of the compression head 20 and the end cap 10 and into the replenishing chamber 5 thus metering the amount of damping fluid to flow from the lower chamber portion and into the replenishing chamber during the compression stroke. The compression action of the shock absorber can therefore be controlled by correctly selecting the size of the port 31 so that the flow of damping fluid therethrough can be metered to the required flow rate.

During the compression stroke, the high fluid energy in the second chamber portion also acts on the replenishing valve, but instead of unseating it as with the compression valve, the replenishing valve is forced down against its seat thus preventing leakage of fluid during the compression stroke between the replenishing valve and its respective seat.

During the rebound stroke piston 3 moves axially along the cylinder 2 in a direction away from the compression and replenishing valve assembly 6 causing the fluid in the lower chamber portion 8 to decrease in energy below that of the fluid in the replenishing chamber 5. As can be seen in FIG. 3, this differential in damping fluid energy acts on the replenishing valve 30 until the force of the replenishing valve spring 57 is overcome and the replenishing valve 30 moves away from the valve seat 22. This energy differential also acts to force the compression valve 55 against its respective seat thus preventing leakage of fluid through port 31. The axial movement of this replenishing valve 30 is limited when the bent portions 53 of the valve spring retainer contact the compression head 20.

With the replenishing valve moved away from its seat a relatively unrestricted path for fluid to flow from replenishing chamber 5 to lower chamber portion 8 is opened. This valve movement in conjunction with the action of the piston valving controls the rebound stroke of the shock absorber.

Although one embodiment of this invention has been illustrated and described here, it will be understood that the invention is susceptible to various modifications and adaptations within the scope of the appended claims.

We claim:

1. A shock absorber comprising an inner cylinder member, an outer tubular member surrounding said cylinder member, first and second end closure means for the opposite adjacent ends of said cylinder member and said tubular member defining between the exterior periphery of said cylinder member and the interior periphery of the outer tubular member an annular replenishing chamber, a piston slidably mounted within said cylinder member and having a piston rod extending therefrom outwardly in slidably sealed relation to said first end closure means, first and second mounting means on the outer end of said piston rod and the exterior of said second end closure means, a body of hydraulic fluid filling variable volume chambers within said cylinder member on opposite sides of said piston and partially filling said replenishing chamber, means in said piston for controlling the flow of hydraulic fluid between said variable volume chambers, and a compression head assembly for controlling the flow of fluid between said replenishing chamber and the variable volume chamber having an end defined by said second end closure means, the improvement which comprises said compression head assembly comprising a cup-shaped compression head of substantially uniform wall thickness mounted adjacent said second end closure means, said compression head including a cylindrical wall portion disposed in sealingly engaged relation to the interior periphery of said cylinder member, annularly spaced flange portions extending radially outwardly from the end of said cylindrical wall portion adjacent said second end closure means into engaged relation to the adjacent end of said cylinder member so as to prevent axial movement of said compression head, and a circular wall portion extending radially inwardly from the opposite end of said cylindrical wall portion, said circular wall portion having a central replenishing opening therein and an axially inwardly facing replenishing valve seat surrounding said replenishing opening, a replenishing valve member having a disk portion movable axially into and out of sealing relation with said replenishing valve seat, said disk portion having a central compression opening therein and a compression valve seat extending around the same which faces in an opposite axial direction from said replenishing valve seat, a compression valve member mounted for axial movement into and out of engagement with said compression valve seat, said replenishing valve member including a pair of valve stem portions extending from said disk portion through said replenishing opening, a spring retaining member abuttingly engaged with said valve stem portions, said valve stem portions including free end extensions bent over said spring retaining member to secure the same in said abuttingly engaged relation, first spring means between said spring retaining member and said compression valve member resiliently urging the same into engagement with said compression valve seat and second spring means between said circular wall portion and said spring retaining member resiliently urging the latter and the replenishing valve member secured thereto in a direction to engage the disk portion thereof with said replenishing valve seat.

* * * * *